United States Patent [19]

Akashi et al.

[11] Patent Number: 4,742,512
[45] Date of Patent: May 3, 1988

[54] MULTIPOINT COMMUNICATION SYSTEM HAVING POLLING AND RESERVATION SCHEMES

[75] Inventors: Fumio Akashi; Kazutomo Kobayashi; Junji Namiki; Kojiro Watanabe, all of Tokyo, Japan

[73] Assignee: NEC Corporation, Tokyo, Japan

[21] Appl. No.: 887,003

[22] Filed: Jul. 18, 1986

[30] Foreign Application Priority Data

| Jul. 19, 1985 | [JP] | Japan | 60-160683 |
| Jul. 22, 1985 | [JP] | Japan | 60-162227 |
| Jul. 22, 1985 | [JP] | Japan | 60-162228 |
| Jul. 22, 1985 | [JP] | Japan | 60-162229 |
| Jul. 22, 1985 | [JP] | Japan | 60-162230 |

[51] Int. Cl.$^4$ ............................ H04J 3/16; H04J 3/06
[52] U.S. Cl. ........................................ 370/96; 370/104
[58] Field of Search ............. 370/95, 104, 90, 96; 340/825.08; 379/92

[56] References Cited

U.S. PATENT DOCUMENTS

3,702,008 10/1972 Groth ............................. 370/96
4,251,865 2/1981 Moore et al. ..................... 370/96

Primary Examiner—Douglas W. Olms
Assistant Examiner—Frank M. Scutch, III
Attorney, Agent, or Firm—Schwartz, Jeffery, Schwaab, Mack, Blumenthal & Evans

[57] ABSTRACT

In a multipoint communication system, first polling signals are sequentially and respectively transmitted to terminal stations on a broadcast channel from a central station, asking a request for reservation without waiting for a reply from the terminal stations. A reservation signal is transmitted on a multiple access channel from a terminal station requesting the reservation to the central station in response to the first polling signal addressed to it. A second polling signal is then transmitted on the broadcast channel in response to the reservation signal and the multiple access channel is reserved for a period of time variable in accordance with the reservation signal. A data signal is transmitted from the terminal station requesting the reservation on the reserved multiple access channel in response to the second polling signal.

11 Claims, 9 Drawing Sheets

MULTIPOINT COMMUNICATION SYSTEM HAVING POLLING AND RESERVATION SCHEMES

BACKGROUND OF THE INVENTION

The present invention relates to a multipoint communication system in which a broadcast channel is established from a central station to each of a plurality of terminal stations and a multiple access channel is established from each terminal station to the central station, the central station polling the terminal stations in succession asking the polled stations to transmit.

In a multipoint communication system, the central station sends polling messages one by one to the terminal stations, asking the polled stations to transmit. If the polled station has a data signal to transmit, it goes ahead; if not, a negative reply, or absence of reply, is received by the central station, which then polls the next terminal station in sequence. However, this constant exchange of control messages between the central and terminal stations is not efficient if the round-trip propagation delay is large as in the satellite communication system.

SUMMARY OF THE INVENTION

It is therefore an object of the present invention to provide a multipoint communication system which is efficient in channel utilization.

This object is attained by a central station sequentially polling the terminal stations asking a request for reservation in quick succession without waiting for a reply thereform and reserving time slots in response to the reservation and polling the terminals requesting the reservation to transmit a data signal on the reserved time slots.

In a communication system according to a broader aspect of the invention, first polling signals are sequentially and respectively transmitted to terminal stations on a broadcast channel from a central station, asking a request for reservation without waiting for a reply from the terminal stations. A reservation signal is transmitted on a multiple access channel from a terminal station requesting a reservation to the central station in response to the first polling signal addressed to it. A second polling signal is then transmitted on the broadcast channel in response to the reservation signal and the multiple access channel is reserved for a period of time variable in accordance with the reservation signal. A data signal is transmitted from the terminal station requesting the reservation on the reserved multiple access channel in response to the second polling signal.

According to a specific aspect of the present invention which is useful for a large number of terminal stations, the terminal stations are divided into a plurality of groups and the first polling signals are transmitted on the broadcast channel sequentially and respectively to the groups, asking a request for reservation from the terminal stations of each group. A reservation signal is transmitted on the multiple access channel from the terminal stations wishing to send a data signal. A second polling signal is transmitted in response to the reservation signal and the multiple access channel is reserved for a period of time variable in accordance with the reservation signal. The data signal is then transmitted on the reserved multiple access channel in response to the second polling signal.

Preferably, means are provided for detecting an error in the reservation signal which might occur when competition arises between the terminal stations of a given group wishing to make a reservation. When the error is detected, the second polling signals are transmitted sequentially and respectively to these stations to permit them to send reservation signals again.

BRIEF DESCRIPTION OF THE DRAWINGS

The present invention will be described in further detail with reference to the accompanying drawings, in which.

DETAILED DESCRIPTION

Figure 1:
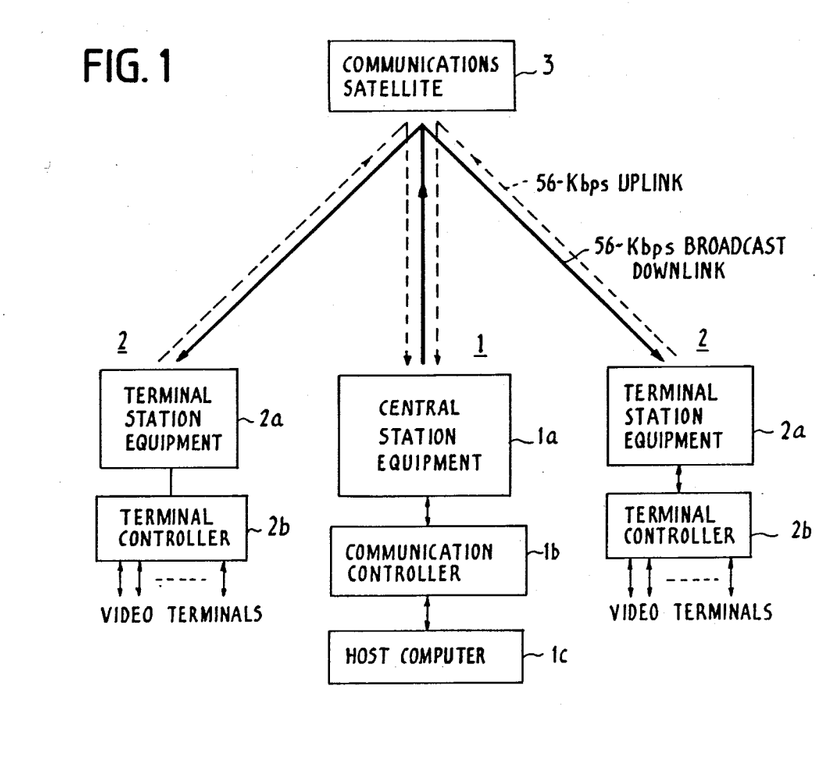
FIG. 1 is a schematic illustration of a communication system embodying the present invention.

As schematically represented in FIG. 1, the telecommunication system embodying the present invention comprises a central station 1, a plurality of terminal stations 2 and a communications satellite 3 having a transponder. Central station 1 has access to the terminal stations through a 56-Kbps TDMA (time-division multiple access) broadcast downlink channel and each of the terminal stations has access to the central station through a 56-Kbps multiple access uplink channel. Central station 1 comprises a central-station communication equipment 1a having a large antenna for transmission of a high power signal through the satellite transponder on the broadcast downlink for enabling it to be received by small antennas at the terminal stations and for reception of weak signals through the satellite transponder transmitted on uplink channels from the terminal stations. A data signal received by equipment 1a is applied through a communication controller 1b to a host computer 1c which processes the signal and returns it to the controller 1b. Each of the terminal stations 2 comprises a terminal station equipment 2a having a small antenna for transmission of signal generated by video terminals, or personal computers on an uplink channel and reception of signals relayed by the satellite transponder. A terminal controller 2b establishes a path to the video terminals. No communication channels are established between the terminal stations 2.

Figure 2:
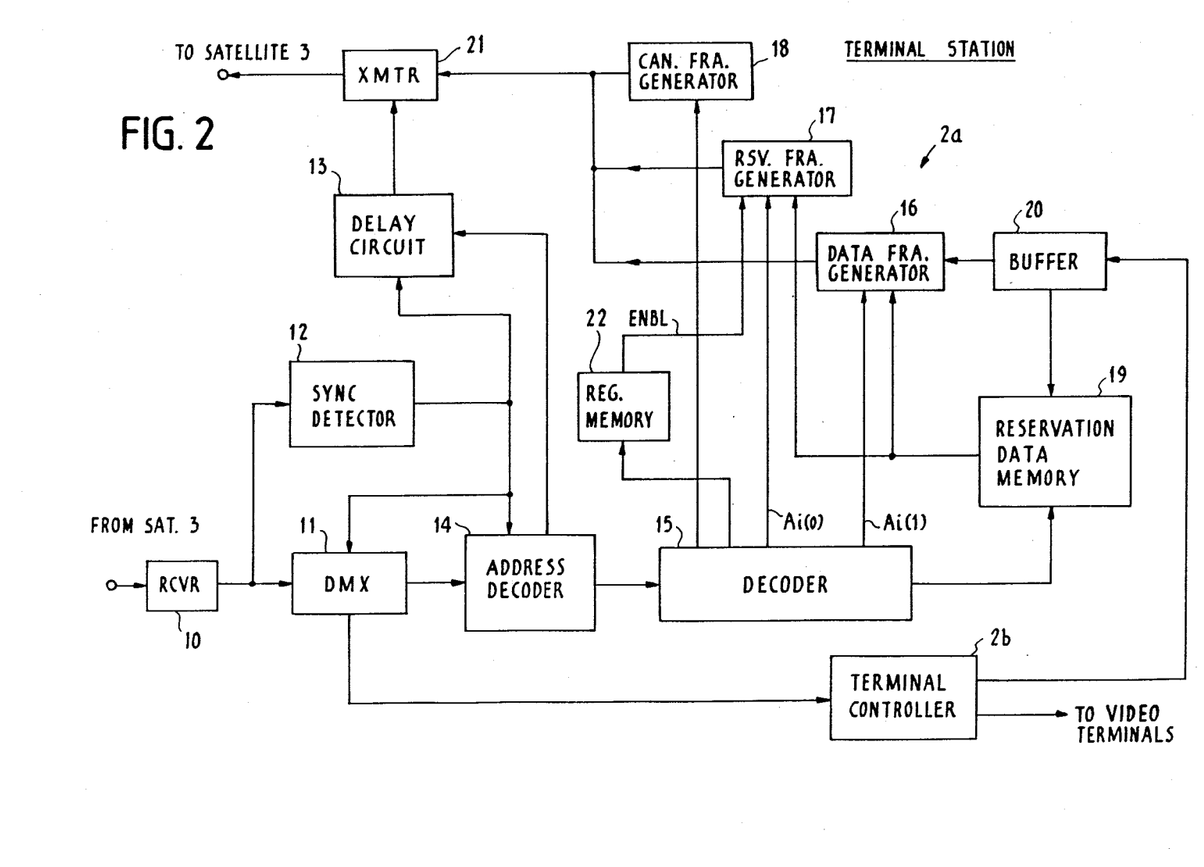
FIG. 2 is a block diagram of each of the terminal stations of FIG. 1 according to an embodiment of the invention.

As shown in FIG. 2, the communication equipment 2a of each terminal station 2 comprises a receiver 10 which is coupled to the antenna, not shown, of the terminal station to receive signals from the satellite 3 and transmits it to a time-division demultiplexer 11 and to a sync detector 12.

Figure 4:
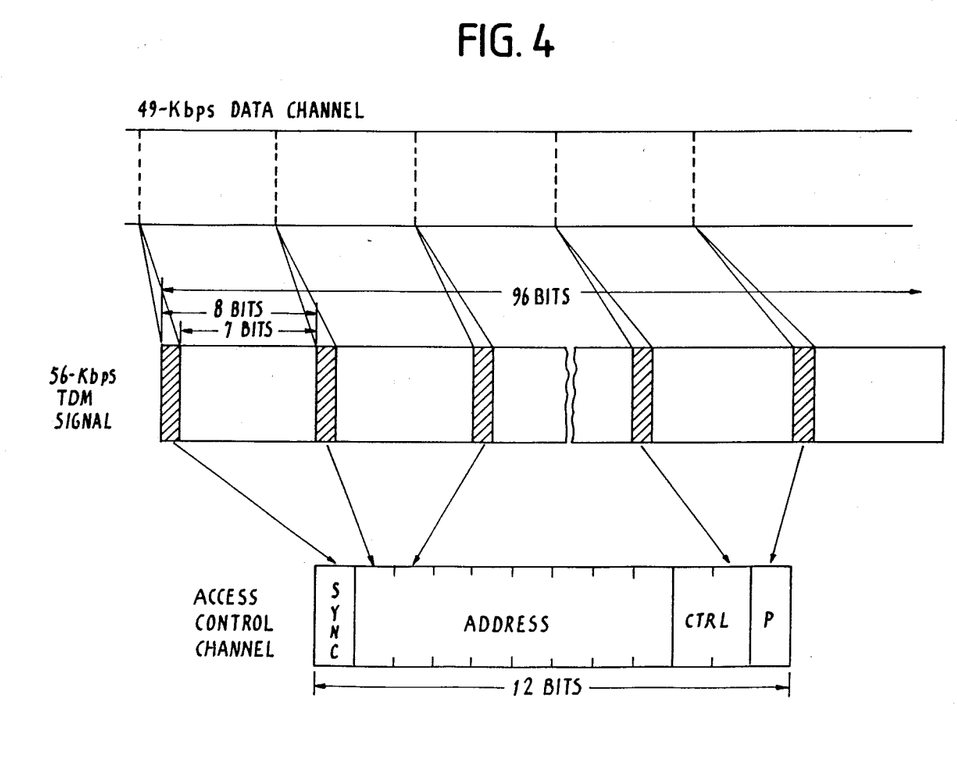
FIG. 4 is an illustration of the frame structure of the signal transmitted by the central station.

As illustrated in FIG. 4, the signal received from the satellite 3 is a 56-Kbps time-division multiplexed signal composed of a 49-Kbps data channel comprising a series of 7-bit data and a 7-Kbps access control channel formed by a frame synchronization bit which appears at 96-bit intervals on the 56-Kbps data bit stream, an 8-bit address code, a 2-bit control code and a parity bit. Each bit of the access control channel is extracted from the 56-Kbps TDM signal at 8-bit intervals. As will be described later, the access control channel forms a polling frame Ai(k) or a group polling frames Agi(k) (where i represents the identification number of the individual terminal stations or the groups of terminal stations given by the 8-bit address code and k represents the contents of the 2-bit control code), to permit the terminal station to make reservations for transmission of their data.

The frame sync bit is extracted by the sync detector 12 and applied as a timing signal to demultiplexer 11, a delay circuit 13 and an address decoder 14. Demultiplexer 11 utilizes the timing signal to demultiplex the incoming signal and applies the 8-bit address code to the address decoder 14 and the 49-Kbps data bit stream to the terminal controller 2b. If the received address code coincides with the address code of the own terminal station, address decoder 14 supplies the two-bit control code to a decoder 15. Terminal station equipment includes a data-frame generator 16, a reservation-frame generator 17 and a cancel-frame generator 18. These frame generators are selectively enabled by the decoder 15 depending on the received control code. The output of terminal 2b is connected to a buffer 20 in which data to be transmitted is stored. A reservation data memory 19 is connected to the buffer 19 and decoder 15 and supplies reservation data to data-frame generator 16 and reservation-frame generator 17.

If the control code of a polling frame from the central station indicates that a "reservation frame" be transmitted, the decoder 15 enables the reservation data memory 19 to read all data bits out of buffer 20, enables the reservation-frame generator 17 to receive a signal from the memory 19 indicating the length of time slots for data frames to be transmitted and generates a reservation frame in a manner to be described below. If the control code indicates that a "data frame" be transmitted, the decoder 15 enables the data-frame generator 16 to receive a time-slot-length signal from the memory 19 and data bits from the buffer 20. The data remaining in the communication controller 1b is supplied to buffer 20 after transmission of a given data frame and the length of the data stored into the buffer 20 is detected and stored in the reservation data memory 19 as a reservation time-slot signal to be used in the transmission of a subsequent data frame. The data-frame generator 16 composes a data frame with data bits stored in buffer 20 and a signal indicating the length of time slots to be reserved for the next transmission.

The reservation or data frame so generated is applied to a transmitter 21 where it is modulated on a PSK (phase shift keying) carrier and transmitted to the satellite after a prescribed time delay following the receipt of the frame destined to the own terminal station. Specifically, when a received frame is destined to the own station, the address decoder 14 introduces an integral multiple of the 96-bit interval to the frame sync supplied to the delay circuit 13.

Figure 5:
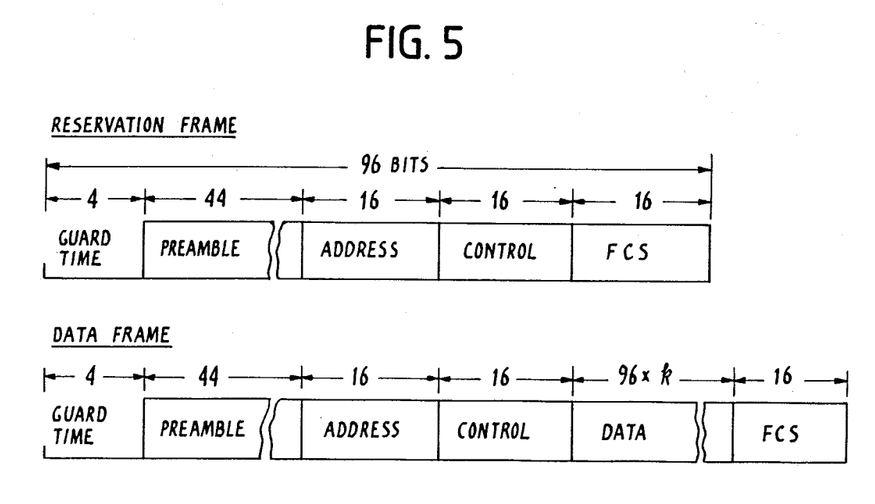
FIG. 5 is an illustration of the frame structures of reservation and data frames transmitted by the terminal station.

As shown in FIG. 5, the reservation frame is a fixed length code of 96 bits. Specifically, it is composed of a 4-bit guard time followed by a series of a 44-bit preamble, 16-bit address code, a 16-bit control code and a 16-bit error-detection frame check sequence. The 4-bit guard time is a no-signal period which prevents the frame to overlap with a successively occurring reservation frame transmitted from another terminal station. The 44n-bit preamble is to allow the terminal station to establish synchronism with the central station. The 16-bit address code signifies the address of the own terminal station and the 16-bit control data contains information on the presence and absence of reservation time slots and on the length of reserved time slots, if any. On the other hand, the data frame is a variable length code which is composed of an integral multiple of 96 bits of information and is generally similar to the reservation frame with the exception that an integral multiple of 96 data bits is inserted between the control code and frame check sequence. The data bits include an information signal and a reservation time-slot signal indicating the length of time slots to be reserved for the transmision of the next data frame.

Terminal station 2 further includes a registration memory 22. As will be described, decoder 15 stores a registration signal into the memory 22 when it decodes a "registration polling frame" sent from the central station at periodic intervals interleaved with normal polling cycles. The registration signal stored in memory 22 enables the reservation-frame generator 17. This allows only those terminal stations registered in the system to participate in the polling communication to thereby reduce the amount of necessary time spaces for data transmission.

Figure 3:
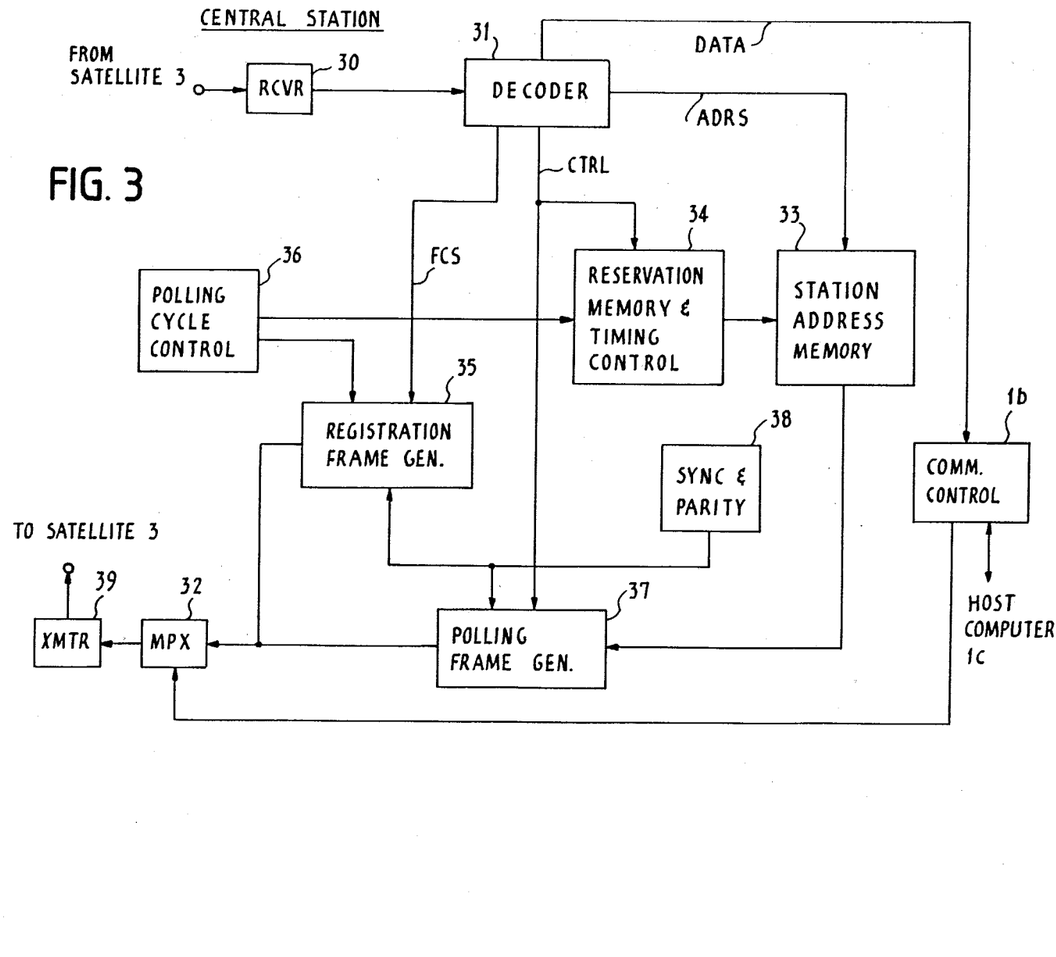
FIG. 3 is a block diagram of the central station according to the first embodiment.

In FIG. 3, the central-station equipment 1a comprises a receiver 30 which receives PSK data signals from the satellite transponder and provides demodulation of the received carrier and detection of the 44-bit preamble and applies the demodulated frame signal without the preamble to a decoder 31. Decoder 31 analyzes the contents of the frame check sequence for error, and if there is no error bit, proceeds to analyze the contents of the address code and control code to check to see if the calling station is making a request for reservation or sending a data frame. If a data frame is received, decoder 31 separates the data signal from the frame and sends it to the communication controller 1b, which applies it to the host computer 1c. Computer 1c returns a processed signal through controller 1b to a time-division multiplexer 32. The decoded address code is applied from decoder 31 to a station address memory 33 and stored into sequentially addressable locations. A reservation memory and timing controller 34 is connected to an output of decoder 31 from which the contents of the control code are supplied. Timing controller 34 is connected to the memory 33 to read address codes from the memory 33 in response to a signal at the control output of decoder 31. Preferably, the terminal station includes a registration frame generator 35 which generates a registration frame in a manner as will be described later. A polling cycle controller 36 enables the timing controller 34 and registration frame generator 35 according to a predetermined sequence. Registration frame generator 35 is also connected to an FCS output of the decoder 31 to regenerate a registration frame when an error occurs in the received frame. A polling frame generator 37 for generating a polling frame using address codes supplied from the memory 33 and a timing signal from the control output of decoder 31. A sync and parity generator 38 supplies a frame sync and a parity bit to the registration frame generator 35 and polling frame generator 37. The outputs of frame generators 35 and 37 are time-division multiplexed with the output of controller 1b by the multiplexer 32 and modulated on a PSK carrier by a transmitter 39 and transmitted to the satellite transponder.

During initial period of operation, a series of 12-bit polling frames Ai(0) are generated for successively polling the terminal stations to inquire whether a request for reservation is made. Each polling frame Ai(0) has a terminal station address code and an all-zero-bit control code asking a request for reservation of time slots from the terminal stations. As will be described later, the control code of the polling frame is updated with all binary 1's to indicate that a request for reservation is acknowledged by the central station and transmitted as a polling frame Ai(1) to the terminal stations.

Immediately following the initial period, the timing circuit 34 generates a timing signal if the control output of the decoder 31 indicates that the received frame contains a reservation request. When this occurs, the polling frame generator 37 receives the address code of the frame in question from memory 33 and a signal from decoder 31 indicating that a reservation has been made and generates a 12-bit polling frame Ai(1) for acknowledging the receipt of the reservation request. The polling frames Ai(1) are generated at times which are determined by the successive lengths of time slots reserved by each terminal station in a manner as will be detailed later. Station address memory 33 stores the address codes of registered terminal stations which have responded to a registration polling frame. This registration polling sequence takes place at intervals under control of the polling cycle controller 36. With this polling procedure, the memory 33 is loaded with a list of terminal stations, so that polling frames $A_1(0)$ through $A_n(0)$ are generated for sequentially addressing the registered terminal stations No. 1 to No. "n". Station address memory 33 is updated in response to an output signal from the decoder 31 whenever a new terminal station participates in the polling sequence or registration is cancelled.

Figure 6:
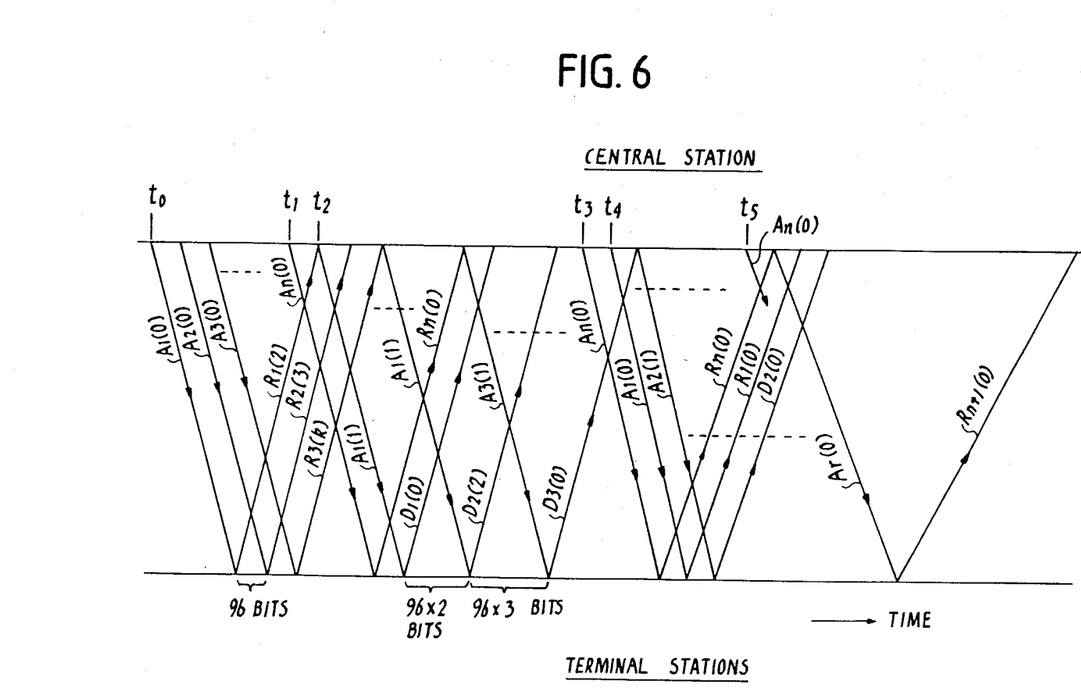
FIG. 6 is a timing diagram illustrating a sequence of signals exchanged between the central station and terminal stations.

The operation of the communications system according to an embodiment of the present invention will be best understood with reference to FIG. 6.

When the system is initiated, central station 1 is in a first polling cycle between times $t_0$ and $t_1$. In this cycle, the control output of decoder 31 is at low level which causes the transmission timing circuit 34 to generate a series of timing pulses at 96-bit intervals and causes the polling frame generator 37 to generate a series of polling frames $A_1(0), A_2(0), A_3(0) \ldots A_n(0)$ for sequentially inquiring a request for reservation from the polled stations. These polling frames are received by the registered terminal stations and decoded by the decoder 15 of the respective terminal stations. Assume that the No. 1, No. 2 and No. 3 terminal stations wish to reserve two, three and "k" time slots, respectively, and no reservation is made by the No. "n" terminal station. In the No. 1 terminal station, reservation data memory 19 stores a signal indicating the reservation of two time slots which is coupled to the reservation frame generator 17. On the other hand, the received polling frame $A_1(0)$ is deocded by decoder 15 to cause the reservation frame generator 17 to generate a reservation frame $R_1(2)$ having an address code of the own station and a control code indicating two time slots to be reserved. Likewise, in the No. 2 terminal station, reservation data memory 19 stores a signal indicating the reservation of three time slots which is applied to the reservation frame generator 17. The decoding of the received polling frame $A_2(0)$ by decoder 15 enables the reservation frame generator 17 to generate a reservation frame $R_2(3)$ having an address code of the No. 2 terminal station and a control code indicating three time slots to be reserved. Likewise, the No. 3 terminal station generates a reservation frame $R_3(k)$. Since there is no reservation data in the memory 19 of the No. "n" station, the decoding of the received polling frame $A_n(0)$ by decoder 15 causes a reservation frame $R_n(0)$ to be generated by the frame generator 17. Reservation frames $R_1(1), R_2(2), R_3(3) \ldots R_n(0)$ so generated are sequentially transmitted at 96-bit intervals from the respective terminal stations to the central station as illustrated in FIG. 6.

The central station now enters a second polling cycle which runs between times $t_2$ and $t_3$. In this cycle, the central station produces polling frames Ai(1) or Ai(0), where "1" in the parenthesis indicates that the central station acknowledges the receipt of a request for reservation from those stations returning reservation frames Ri(j), where j indicates the length of time slots to be reserved, and "0" in the parenthesis indicates that no request for reservation is made from the station of interest and the central station again inquires a request for reservation from that station.

Specifically, a polling frame $A_1(1)$ acknowledging the receipt of reservation frame $R_1(2)$ is first generated. If the reservation frame $R_1(1)$ arrives before the last polling frame $A_n(0)$ is transmitted, the reservation timing circuit 34 delays the transmission of the polling frame $A_1(1)$ until the polling frame $A_n(0)$ is transmitted. A polling frame $A_2(1)$ acknowledging the receipt of reservation frame $R_2(2)$ is generated two time slots (96 ×2 bits) after the transmission of polling frame $A_1(1)$, followed by a polling frame $A_3(1)$ acknowledging the receipt of reservation frame $R_3(3)$ which is generated three time slots after the transmission of the polling frame $A_2(1)$. Since the No. "n" station has no reservation, a polling frame $A_n(0)$ acknowledging the receipt of reservation frame Rn(0) is generated at times $t_3$ for acquisition of a reservation request. The timed transmission of the acknowledging polling frames Ai(1) and Ai(0) is controlled by the transmission timing circuit 34 as described previously.

The transmission of polling frames $A_1(1), A_2(1), A_3(1)$ and An(0) during the period between times $t_2$ and $t_3$ causes the terminal stations No. 1, No. 2, No. 3 to transmit data frames in succession and causes the terminal station No. "n" to generate a reservation frame Rn(0). Assume that the Nos. 1, 3 and "n" terminal stations have no reservations for the next transmission cycle and the No. 2 station wishes to make a further reservation for two time slots. In the No. 1 terminal station, the data-frame generator 16 prepares a data frame $D_1(0)$ using a data signal of the previously reserved two time-slot length supplied from buffer 20 and a signal from reservation data memory 19 which indicates the absence of data to follow. Likewise, a data frame $D_2(2)$ is prepared by the station No. 2 using the previously reserved three-time slot data and a two-time-slot signal from reservation data memory 19 which indicates the reservation of data to follow. A data frame $D_3(0)$ is prepared by the No. 3 terminal station using a data signal of the previously reserved "k" time-slot length and an absence-of-reservation signal from memory 19. As illustrated in FIG. 6, data frames D1(0), D2(2) and D3(0) are transmitted in response to the arrivals of acknowledgement polling frames $A_1(1)$, $A_2(1)$ and $A_3(1)$, respectively. Since the No. "n" station has made no reservation during the period between times $t_0$ and $t_1$ and is assumed to make no reservation during the next period, a reservation frame Rn(0) is transmitted to the central station instead of data frame in response to the polling frame An(0) which is transmitted at time $t_3$.

After the transmission of the data and reservation frames from the terminal stations, the central station enters a third polling cycle which runs between times $t_4$ and $t_5$. In this cycle, polling frames Ai(1) are generated to acknowledge the receipt of reservations contained in the previous data frames and polling frames Ai(0) are generated for acquisition of reservation requests from terminal stations from which no data frames were transmitted in the immediately preceding transmission cycle. Specifically in FIG. 3, the timing circuit 34 is enabled in response to an output signal from the polling cycle controller 36 at time $t_3$. At time $t_4$, timing circuit 34 starts generating timing pulses at 96-bit intervals to cause the frame generator 35 to produce polling frames $A_1(0)$, $A_2(2)$ and $A_3(0)$ which acknowledge the reservation of two time slots for terminal station No. 2 and seek a request for reservation from terminal stations No. 1 and No. 3. In succession to such polling frames, frame generator 35 generates a series of polling frames until time $t_5$ for acquisition of a request for reservation from the remaining terminal stations.

It will be seen from the foregoing that the inclusion of reservation data in a polling communication system in a manner as taught by the invention allows it to reserve necessary time spaces only for those terminal stations requesting a communication while responding to closely spaced return signals, or reservation frames Ri(0) from those terminal stations requesting no communication. Thus, the invention ensures highly efficient transmission of data even if the system has a large amount of transmission delay.

Central station 1 periodically enters a polling cycle in response to an output of polling cycle controller 36 to broadcast a "registration" polling frame Ar(0). The registration polling frame is decoded by the decoder 15 of a terminal station which has not previously been registered but wishes to participate in the polling sequence. An enable signal is supplied from decoder 15 to a registration memory 22 (FIG. 2) and stored therein until it is cancelled. The stored enable signal causes the reservation frame generator 17 to generate a reservation frame $R_{n+1}(0)$, which is received by the central station 1 if there is no competition with another terminal station wishing to participate in the polling sequence. The reservation frame $R_{n+1}(0)$ is decoded by decoder 31, FIG. 3, and fed to the address memory 33. During the next polling cycle, a polling frame $A_{n+1}(0)$ is transmitted to inquire the length of time slots be reserved. If collision occurs between several terminal stations wishing to participate in the system, the central station detects the collision by consulting the frame check sequence and causes the registration frame generator 35 to repeats the transmission of the registration polling frame Ar(0).

If any terminal station wishes to cancel the registration, the cancel-frame generator 18 (FIG. 2) of that station is activated to transmit a "cancel" frame containing the address code of that station. Decoder 31 of the central station translates the cancel frame and erases the address code of that station stored in memory 33 to prevent it from being polled in subsequent polling cycles. Thus, the polling cycle can be reduced to advantage.

Figure 7:
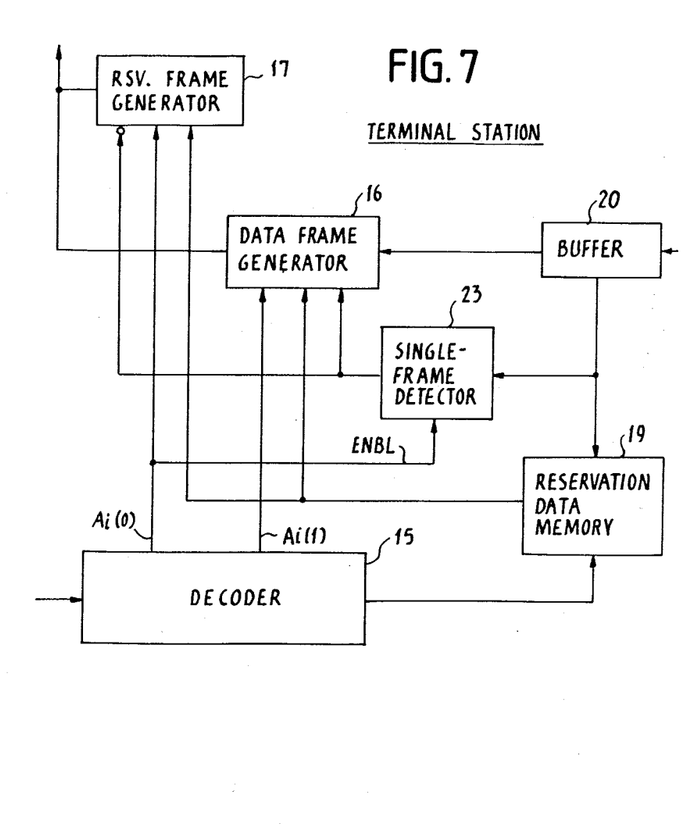
FIG. 7 is a block diagram of the terminal station according to a modified embodiment of the invention.

FIG. 7 is an illustration of a modified form of the terminal station in which parts corresponding to those of FIG. 2 are marked with the same numerals as in FIG. 2. This modification is similar to the FIG. 2 embodiment with the exception that it includes a single-frame detector 23 for generating an output signal when the data stored in buffer 20 is of a single frame (time slot) length. The detector 23 is enabled in response to an output signal of decoder 15 which indicates that an inquiring polling frame Ai(0) has been received from the central station. Detector 23 has an output which enables the data frame generator 16 to transmit a data frame Di(0) by including the one-frame data stored in buffer 20 and disables the reservation frame generator 17. The data frame Di(0) indicates that there is no further data to follow.

Figure 8:
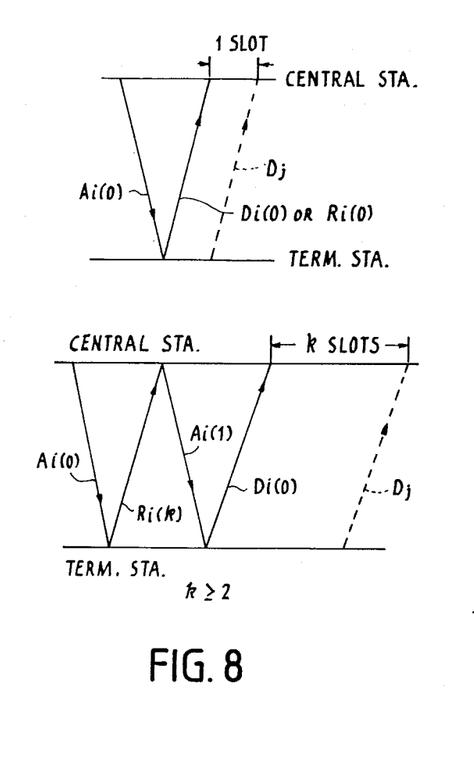
FIG. 8 is a timing diagram associated with the embodiment of FIG. 7.

The operation of the embodiment of FIG. 7 will be understood with reference to FIG. 8. In response to the transmission of a polling frame Ai(0) indicating that the central station is inquiring a request for reservation of time slots from the terminal station "i", decoder 15 of that station enables the detector 23. If there is onenframe data in the buffer 20, detector 23 generates an output which enables data frame generator 16. The one-frame data is transferred to the data frame generator 16 and organized with the address code of the own station into a data frame Di(0), which is transmitted. Upon receipt of the data frame Di(0), the transmission timing circuit 34 of the central station reserves one time-slot length for possible transmission of a subsequent data frame Dj from another terminal station. During this period, reservation frame generator 17 is disabled.

If there is no data signal in the buffer 20 at the time the polling frame Ai(0) is received, data frame generator 16 is disabled and reservation frame generator 17 is enabled to transmit a reservation frame Ri(0) indicating that there is no time slots to be reserved. Transmission timing circuit 34 of the central station operates in response to the reservation frame Ri(0) for transmitting a polling frame Ai(0) acknowledging the receipt of that reservation frame in a manner as described with reference to FIG. 6.

If there is more than one frame data, say "k" frames, in the buffer 20, the reservation frame generator 17 is enabled in response to the receipt of the polling frame Ai(0) to generate a reservation frame Ri(k) incorporating the time-slot length data from memory 19, where k represents the length of time slots to be reserved. The central station responds to the reservation frame Ri(k) by returning a polling frame Ai(1) acknowledging it to allow the terminal station to transmit a data frame Di(0) and assigns "k" time slots to that terminal station.

In the embodiment of FIG. 7, it will be seen that terminal stations having a one frame data are not required to wait for the reception of an acknowledging polling frame Ai(0) before it transmits a data frame. This contributes to the reduction of polling cycle with a resultant increase in data transmission efficiency.

Figure 9:
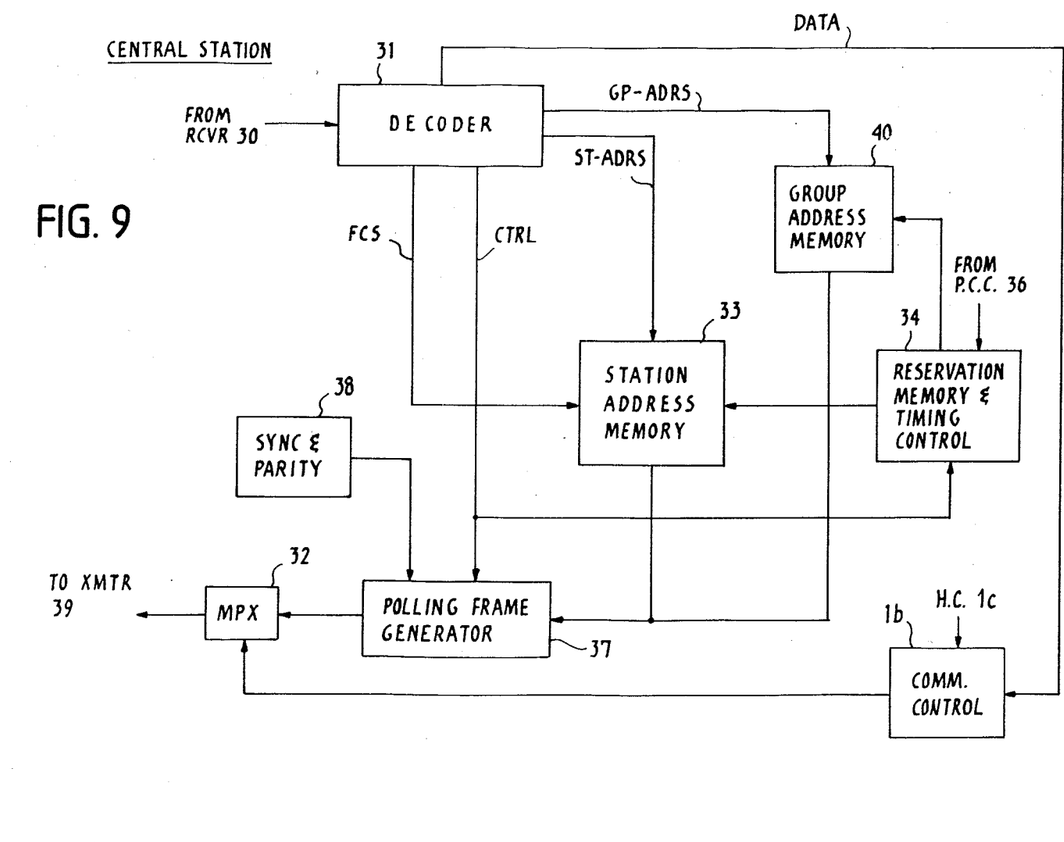
FIG. 9 is a block diagram of the central station according to a modified embodiment of the invention.

FIG. 9 is an illustration of a further modification of the present invention in which the central station is modified to include a group address memory 40 which stores group address codes in locations which are sequentially read out in response to a timing output signal from the transmission timing controller 34. Terminal stations 2 are divided into a plurality of groups of two terminal stations each, for example, so that the Nos. 1 and 2 terminal stations are identified by a group No. 1, the Nos. 3 and 4 terminal stations by a group No. 2 and the Nos. 5 and 6 stations by a group No. 3, and so forth. Each group of terminal stations is identified by a group address code. Polling frame generator 37 generates a polling frame Agi(0) containing a group address code supplied from memory 40 and a control code from decoder 31 indicating that the central station is asking a request for reservation.

Figure 10:
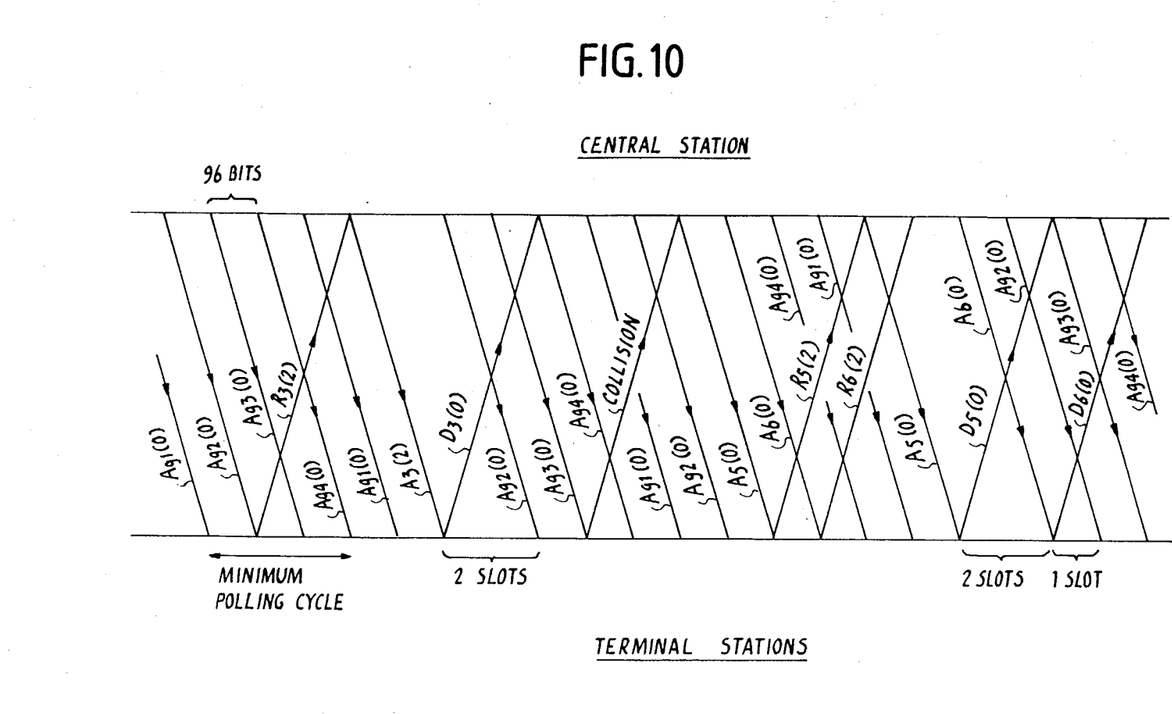
FIG. 10 is a timing diagram associated with the embodiment of FIG. 9.

The operation of the embodiment of FIG. 9 will be understood with reference to FIG. 10. Transmission timing controller 34 causes the group address memory 40 to generate a series of group address codes, which are fed to polling frame generator 37, each group address code being combined with a control code to generate a series of polling frames $Ag_1(0)$ through $Ag_4(0)$ inquiring a request for reservation. Assume that the terminal station No. 3 has a request for reservation of two time slots, for example, it responds to the polling frame $Ag_2(0)$ by transmitting a reservation frame $R_3(2)$. If all the other terminal stations have no reservation requests, no reservation frames are transmitted from these stations. The central station now responds to the reservation frame $R_3(2)$ by causing decoder 31 to translate its station address code and control code and transmitting an acknowledging polling frame $A_3(2)$ while reserving two time slots in the transmission timing controller 34 in order to allow the No. 3 station to transmit a data frame $D_3(0)$ containing data of two time-slot length.

If the terminal stations of group No. 3 have made a request for reservation of two time slots at the same time in response to a polling frame $Ag_3(0)$, a collision occurs between them and an error bit is detected by the decoder 31 of the central station from the reservation frames it received. Thus, decoder 31 supplies an error indicating signal from its FCS terminal to the station address memory 33 to cause it to generate individual polling frames $A_5(0)$ and $A_6(0)$ in succession. Thus, terminal stations Nos. 5 and 6 are able to generate their reservation frames $R_5(2)$ and $R_6(2)$ in succession. The group access approach of the embodiment of FIG. 9 allows reduction of the polling cycle and hence the reduction in transmission waiting time.

The foregoing description shows only preferred embodiments of the present invention. Various modifications are apparent to those skilled in the art without departing from the scope of the present invention. For example, the FIG. 7 embodiment is advantageously incorporated in the group access scheme of FIG. 9 for large population users.

What is claimed is:

1. A communication system comprising:
   first means for establishing a multiple access channel from each of a plurality of terminal stations to a central station and a time-division multiplexed broadcast channel from said central station to said terminal stations;
   second means in said central station for sequentially transmitting on said broadcast channel first polling signals for respectively addressing said terminal stations;
   third means in each of said terminal stations for receiving a respective one of said first polling signals and transmitting on said multiple access channel a reservation signal if there if a data signal to be transmitted to said central station;
   fourth means in said central station for receiving said reservation signal, reserving a time slot in said multiple access channel in accordance with the received reservation signal and transmitting on said broadcast channel a second polling signal to the terminal station from which said reservation signal is received, said second polling signal indicating the length of said reserved time slot; and
   fifth means in each of said terminal stations for receiving said second polling signal and transmitting said data signal in said reserved time slot if no further data signal is present or transmitting said data signal along with a second reservation signal in said reserved time slot if a further data signal is present, whereby said fourth means reserves a second tme slot in said multiple access channel.

2. A communication system as claimed in claim 1, further comprising:
   means in said central station for repeatedly transmitting a third polling signal on said broadcast channel asking a request from said terminal stations for registration into a polling list;
   means for transmitting a return signal on said multiple access channel from the terminal stations making said registration request in response to said third polling signal; and
   means in said central station for registering the terminal stations which have transmitted said return signal into said polling list,
   wherein said second means transmits said first polling signals on said broadcast channel sequentially and respectively to the terminal stations of said polling list.

3. A communicatin system as claimed in claim 2, further comprising:
   means for transmitting a cancelling signal on said multiple access channel from said registered terminal stations; and
   means for cancelling the registration of one or more of said terminal stations which have transmitted said cancelling signal from said polling list in response to said cancelling signal.

4. A communication system as claimed in claim 1 or 2, further comprising means for transmitting a data signal of a predetermined amount on said multiple access channel in response to said second polling signal if the terminal station receiving the second polling signal has no more data signal than said predetermined amount.

5. A communication system as claimed in claim 4, further comprising means for preventing the terminal stations transmitting the return signals in error from being registered and causing said return signal transmitting means to retransmit the return signal in response to said third polling signal of a subsequent occurrence.

6. A communication system as claimed in claim 1, 2 or 3, wherein said fifth means comprises means for transmitting on said multiple access channel said reservation signal of a second occurrence during said reserved time period sequentially with said data signal from the terminal stations wishing to send the data signal of a second occurrence, whereby said fourth means is caused to transmit the second polling signal of a second occurrence and reserve a second time period in said multiple access channel in accordance with the reservation signal of said second occurrence.

7. A communication system for a central station and a plurality of groups of terminal stations, comprising:
- first means for estabalishing a multiple access channel from each of said terminal stations to said central station and a time-division multiplexed broadcast channel from said central station to said terminal stations;
- second means for transmitting first polling signals in succession on said broadcast channel to said terminal stations without waiting for a reply therefrom, said first polling signals being addressed respectively to said groups asking a request for reservation from the terminal stations of each of the addressed groups;
- third means for transmitting a reservation signal on said multiple access channel from one or more of the terminal stations of said addressed groups which wish to send a data signal;
- fourth means for transmitting a second polling signal in response to said reservation signal and reserving said multiple access channel for a period of time variable in accordance with said reservation signal; and
- fifth means for transmitting said data signal on said reserved multiple access channel during said time period in response to said second polling signal.

8. A communication system as claimed in claim 7, further comprising:
- means for detecting an error in the reservation signal; and
- means for causing said fourth means to transmit on said broadcast channel said second polling signals of a second occurrence sequentially and respectively to the terminal stations of said addressed group in response to the detection of said error, whereby said third means is caused to transmit the reservation signals of a second occurrence from the last-mentioned terminal stations in response to said second polling signals of the second occurrence.

9. A communication system as claimed in claim 7, further comprising means for transmitting a data signal of a predetermined amount on said multiple access channel in response to said second polling signal if the terminal station receiving the second polling signal has no more data signal to be sent than said predetermined amount.

10. A communication system as claimed in claim 7, 8 or 9, wherein said fifth means comprises means for transmitting on said multiple access channel said reservation signal of a second occurrence during said reserved time period sequentially with said data signal from the terminal stations wishing to send the data signal of a second occurrence, whereby said fourth means is caused to transmit the second polling signal of a second occurrence and reserve a second time period in said multiple access channel in accordance with the reservation signal of said second occurrence.

11. A data communication method for a network having a multiple access channel established from each of a plurality of terminal stations to a central station and a time-division multiplexed broadcast channel established from said central station to said terminal stations, comprising the steps of:
- (a) sequentially transmitting on said broadcast channel first polling signals from said central station for respectively addressing said terminal stations;
- (b) respectively receiving said first polling signals at said terminal stations and transmitting on said multiple access channel a reservation signal if a data signal is present in one of said terminal stations;
- (c) receiving said reservation signals at said central station and reserving a time slot in said multiple access channel in accordance with the received reservation signal and transmitting on said broadcast channel a second polling signal addressing the terminal station from which said reservation signal is received, said second polling signal indicating the length of said reserved time slot;
- (d) receiving said second polling signal at said addressed terminal station and transmitting said data signal in said reserved time slot if no more data signal is present or transmitting said data signal along with a second reservation signal in said reservation time slot if a further data signal is present; and
- (e) receiving said second reservation signal at said central station and reserving a second time slot in said multiple access channel in accordance with the received second reservation signal and transmitting on said broadcast channel a third polling signal addressing the terminal station from which said second reservation signal is received, said third polling signal indicating the length of said reserved second time slot.

* * * * *